US012296712B2

(12) United States Patent
Inui et al.

(10) Patent No.: US 12,296,712 B2
(45) Date of Patent: May 13, 2025

(54) CHARGING AND DISCHARGING CONTROL DEVICE

(71) Applicant: PRIME PLANET ENERGY & SOLUTIONS, INC., Tokyo (JP)

(72) Inventors: Shinya Inui, Kakogawa (JP); Masaki Yugou, Kakogawa (JP); Kimihiko Furukawa, Kakogawa (JP); Noriharu Kobayashi, Kakogawa (JP); Kohki Nakamura, Okazaki (JP); Keiichi Ito, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 206 days.

(21) Appl. No.: 17/931,675

(22) Filed: Sep. 13, 2022

(65) Prior Publication Data

US 2023/0104789 A1 Apr. 6, 2023

(30) Foreign Application Priority Data

Sep. 21, 2021 (JP) .................................. 2021-152816

(51) Int. Cl.
| | |
|---|---|
| *B60L 58/00* | (2019.01) |
| *B60L 53/62* | (2019.01) |
| *B60L 58/12* | (2019.01) |
| *B60L 58/16* | (2019.01) |
| *B60L 55/00* | (2019.01) |

(52) U.S. Cl.
CPC ............... *B60L 58/12* (2019.02); *B60L 53/62* (2019.02); *B60L 58/16* (2019.02); *B60L 55/00* (2019.02)

(58) Field of Classification Search
None
See application file for complete search history.

(56) References Cited

U.S. PATENT DOCUMENTS

| | | | |
|---|---|---|---|
| 2011/0276194 A1 | 11/2011 | Emalfarb et al. | |
| 2012/0323386 A1* | 12/2012 | Ito ......................... | B60L 53/63 700/291 |

(Continued)

FOREIGN PATENT DOCUMENTS

| | | |
|---|---|---|
| CN | 108454433 A | 8/2018 |
| EP | 3 363 676 A1 | 8/2018 |

(Continued)

*Primary Examiner* — Truc M Do
(74) *Attorney, Agent, or Firm* — Finnegan, Henderson, Farabow, Garrett and Dunner, LLP (57) ABSTRACT

A charging and discharging control device disclosed herein controls a charging and discharging device that charges and discharges an on-vehicle battery mounted on an electric vehicle. The charging and discharging control device includes a detection controller configured or programmed to detect that the electric vehicle has been connected to the charging and discharging device, an SOC acquisition controller configured or programmed to acquire an SOC of the on-vehicle battery, a use information acquisition controller configured or programmed to acquire a next use time and a next travel distance of the electric vehicle, and a setting controller configured or programmed to set a charging and discharging schedule of the on-vehicle battery such that the on-vehicle battery is charged after having been maintained in a low SOC and a necessary SOC for the next use time and the next travel distance remains.

9 Claims, 4 Drawing Sheets

(56) References Cited

U.S. PATENT DOCUMENTS

| | | |
|---|---|---|
| 2013/0285608 A1 | 10/2013 | Jikihara |
| 2014/0236379 A1 | 8/2014 | Masuda et al. |
| 2018/0241229 A1 | 8/2018 | Kitaoka et al. |
| 2018/0312072 A1* | 11/2018 | Yang ..................... B60L 55/00 |
| 2021/0083497 A1* | 3/2021 | Fujita ................... H02J 7/0013 |
| 2021/0107371 A1 | 4/2021 | Tsuchiya |
| 2021/0122260 A1 | 4/2021 | Kazuno |

FOREIGN PATENT DOCUMENTS

| | | |
|---|---|---|
| JP | 2012-191736 A | 10/2012 |
| JP | 2015-095983 A | 5/2018 |
| JP | 2018-137886 A | 8/2018 |
| JP | 2018-207590 A | 12/2018 |
| JP | 2019-154167 A | 9/2019 |
| JP | 2021-61712 A | 4/2021 |
| JP | 2021-069215 A | 4/2021 |
| WO | WO 2012/093638 A1 | 7/2012 |
| WO | WO 2013/051151 A1 | 4/2013 |

* cited by examiner

FIG.4 ic vehicle has been proposed. For example, a so-called vehicle-

CHARGING AND DISCHARGING CONTROL DEVICE

CROSS REFERENCE TO RELATED APPLICATIONS

The present application claims priority from Japanese Patent Application No. 2021-152816 filed on Sep. 21, 2021, which is incorporated by reference herein in its entirety.

BACKGROUND

The present disclosure relates to a charging and discharging control device.

Japanese Laid-open Patent Publication No. 2019-154167 discloses an electric vehicle charging system that performs charging on a secondary battery of an electric vehicle by an external charger. The electric vehicle charging system includes a charging completion time setting section by which a charging completion time is set by an operation of a user and a charging control section that controls charging to the secondary battery in an electric vehicle. The charging control section includes a charging pattern control section that performs control to set a charging pattern in which a staying time in an SOC region and a temperature range in which deterioration of the secondary battery tends to progress is reduced or eliminated between a charging control start time to a charging completion time, based on temperature transition and an SOC at the charging control start time. According to the electric vehicle charging system having the above-described configuration, deterioration of the secondary battery during charging and discharging performed by the external charger can be suppressed.

SUMMARY

Incidentally, a technology of effectively utilizing electric power using an on-vehicle battery mounted on an electric vehicle has been proposed. For example, a so-called vehicle-to-grid (V2G) that supplies electric power to an electric power system from an electric vehicle and a so-called vehicle-to-home (V2H) that supplies electric power to a home from an electric vehicle have been proposed. However, for on-vehicle batteries of electric vehicles that participate in V2G and V2H, charging and discharging can be repeated in order to meet a power demand. Depending on a charging and discharging state of an on-vehicle battery, there is a concern that deterioration of the on-vehicle battery is accelerated.

A charging and discharging control device disclosed herein controls a charging and discharging device that charges and discharges an on-vehicle battery mounted on an electric vehicle. The charging and discharging control device includes a detection controller configured or programmed to detect that the electric vehicle has been connected to the charging and discharging device, an SOC acquisition controller configured or programmed to acquire an SOC of the on-vehicle battery of the electric vehicle connected to the charging and discharging device, a use information acquisition controller configured or programmed to acquire a next use time and a next travel distance of the electric vehicle connected to the charging and discharging device, and a setting controller configured or programmed to set a charging and discharging schedule of the on-vehicle battery of the electric vehicle such that the on-vehicle battery is charged after having been maintained in a low SOC and a necessary SOC for the next use time and the next travel distance remains. According to the charging and discharging control device, deterioration of the on-vehicle battery can be reduced.

The low SOC may be set to be equal to or less than an SOC in which deterioration of the on-vehicle battery is suppressed. The low SOC may be set to be equal to or more than an SOC in which the electric vehicle can travel for a predetermined distance.

The charging and discharging control device may further include a history acquisition controller configured or programmed to acquire a use history of the electric vehicle, a storage that stores the use history, and a determination controller configured or programmed to determine at least one of the next use time and the next travel distance based on the use history that has been stored. The charging and discharging control device may further include a plan acquisition controller configured or programmed to acquire plan information of the electric vehicle, and a determination controller configured or programmed to determine at least one of the next use time and the next travel distance based on the plan information.

The charging and discharging control device may further include a demand acquisition controller configured or programmed to acquire a fluctuation of a power demand in an electric power system. The setting controller may be configured or programmed to set the charging and discharging schedule such that electric power is discharged to the electric power system from the on-vehicle battery when the power demand of the electric power system is high. The setting controller may be configured or programmed to set the charging and discharging schedule such that electric power is charged to the on-vehicle battery from the electric power system when the power demand of the electric power system is low.

The SOC after charging may be adjusted such that predetermined electric power can be supplied to predetermined electric equipment from the on-vehicle battery. The setting controller may be configured or programmed to set the charging and discharging schedule such that the electric power is supplied to the electric equipment at a predetermined timing.

DETAILED DESCRIPTION

With reference to the attached drawings, an embodiment of a charging and discharging control device disclosed herein will be described below. As a matter of course, the embodiment described herein is not intended to be particularly limiting the present disclosure. The present disclosure is not limited to the embodiment described herein, unless specifically stated otherwise. Members/portions that have the same effect will be denoted by the same sign as appropriate and the overlapping description will be omitted as appropriate.

<Charging and Discharging Management System 100>

Figure 1:
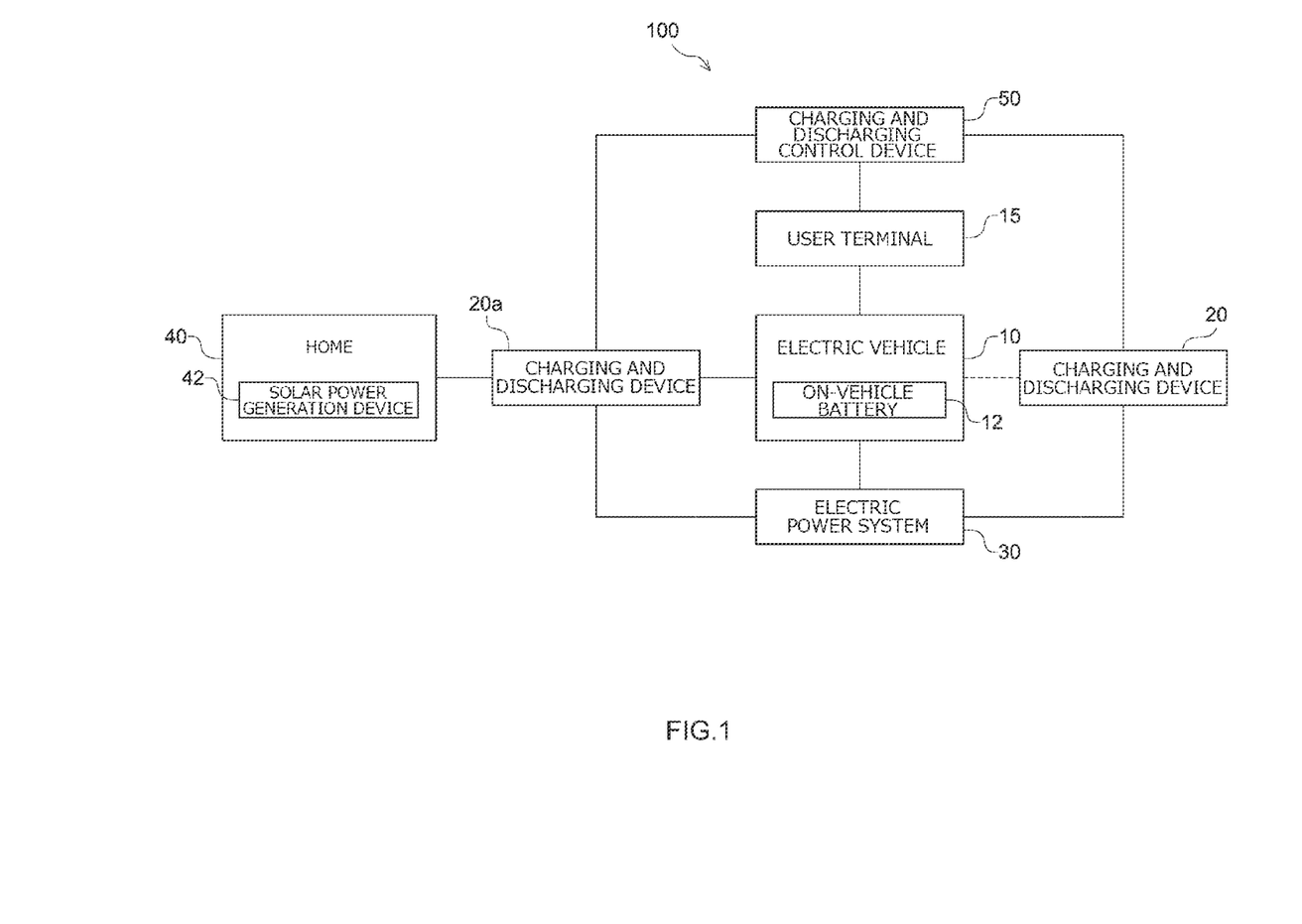
FIG. 1 is a conceptual diagram illustrating a connection relationship of a charging and discharging management system.
Figure 2:
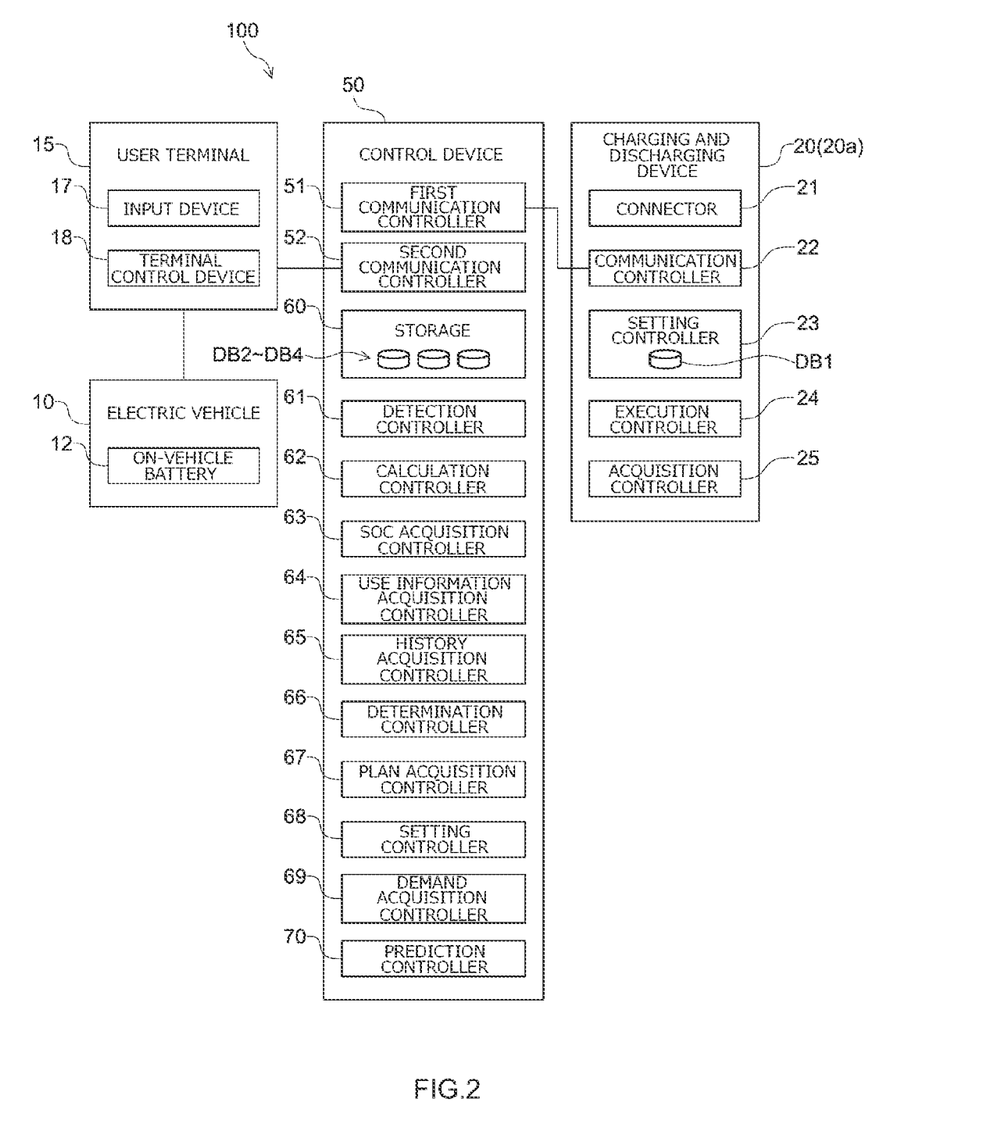
FIG. 2 is a block diagram illustrating the charging and discharging management system.

FIG. 1 is a conceptual diagram illustrating a connection relationship of a charging and discharging management system 100. FIG. 2 is a block diagram illustrating the charging and discharging management system 100. As illustrated in FIG. 1, the charging and discharging management system 100 includes a user terminal 15, a charging and discharging device 20, and a control device 50. Although not illustrated, the charging and discharging management system 100 includes a power storage device in which electric power is stored. The charging and discharging management system 100 manages charging an on-vehicle battery 12 of an electric vehicle 10 with electric power stored in the power storage device and storing electric power discharged from the on-vehicle battery 12 of the electric vehicle 10 in the power storage device. The electric power stored in the power storage device is sold to a specific company, such as an electric power company or the like. The charging and discharging management system 100 can be used for trading electric power, that is, selling and purchasing electric power. The charging and discharging management system 100 is realized, for example, by a client-server system. However, the charging and discharging management system 100 may be realized by cloud computing.

The charging and discharging management system 100 is managed by a system administrator. The system administrator is also called aggregator. The system administrator adjusts an electric power amount to keep a balance between demand and supply of electric power. For example, in response to a request of a specific company, such as an electric power company or the like, the system administrator procures electric power and supplies electric power to the specific company. Therefore, in order to ensure a necessary electric power amount, the system administrator preferably has contracts with as many users of the electric vehicles 10 as possible and as many administrators that manage charge and discharge devices 20 as possible using the charging and discharging management system 100. The electric vehicles 10, the users who use the electric vehicles 10, the charging and discharging devices 20, and administrators who manage the charging and discharging devices 20 are registered in the charging and discharging management system 100. The charging and discharging management system 100 manages electric power by supplying electric power to the electric vehicle 10 from the charging and discharging device 20 (herein, charging) and supplying electric power to the charging and discharging device 20 from the electric vehicle 10 (herein, discharging).

<Electric Vehicle 10>

The electric vehicle 10 includes the on-vehicle battery 12 that can be charged and discharged. The electric vehicle 10 travels using electric power obtained from the on-vehicle battery 12 as an energy source. Examples of the electric vehicle 10 include vehicles, such as a battery electric vehicle (BEV), a hybrid electric vehicle (HEV), a plug-in hybrid electric vehicle (PHEV), or the like, that use electric power as an energy source. The electric vehicle 10 may be a four-wheel vehicle and may be a two-wheel vehicle. The electric vehicle 10 participates in V2G or V2H. That is, the electric vehicle 10 can supply electric power to an electric power system 30 and a home (residence) 40 via the charging and discharging device 20.

A user of the electric vehicle 10 uses the user terminal 15. The user terminal 15 can be used as a terminal to manage information related to use of the electric vehicle 10, charging and discharging, or the like. The user terminal 15 may be, for example, a car navigation system mounted on the electric vehicle 10 and may be a smartphone, a tablet terminal, or a desktop-type or laptop-type personal computer used by the user. The user terminal 15 includes an input device 17 and a terminal control device 18 (see FIG. 2), The input device 17 is a device, such as, for example, a touch panel, a keyboard, a mouse, or the like, that is operated by the user for performing input. The terminal control device 18 is communicably connected to the input device 17 (see FIG. 2). The user terminal 15 further includes a screen or the like used by the user for checking a charging and discharging state of the on-vehicle battery 12, or the like.

Incidentally, a battery use state and a battery charging and discharging state influence a battery life of the on-vehicle battery 12. For example, deterioration of a battery can be progressed by keeping the battery in a state where a charging rate of the battery is high, that is, a so-called high state of charge (SOC) for a long time, repeating quick charging or quick discharging, or the like. According to findings of the present inventors, for example, it is assumed that, in the electric vehicle 10 that participates in V2G or V2H, a time during which the on-vehicle battery 12 is in a high SOC is increased in order to meet a power demand. As a result, there is a concern that deterioration of the on-vehicle battery 12 is progressed, <Charging and Discharging Device 20>

The charging and discharging device 20 is used for performing charging and discharging on the on-vehicle battery 12 mounted on the electric vehicle 10. The charging and discharging device 20 is installed in a charging spot provided in, for example, a home, a business, a commercial facility, a hospital, a gas station, a car dealer, or the like. The charging and discharging device 20 includes a connector 21 (see FIG. 2). The on-vehicle battery 12 of the electric vehicle 10 is charged and discharged via the connector 21 of the charging and discharging device 20. As the connector 21, for example, a charging and discharging cable or the like can be used. The charging and discharging device 20 is configured to be able to supply electric power to the electric power system 30 and the home 40 from the on-vehicle battery 12 via the connector 21.

The charging and discharging device 20 further includes a communication controller 22, a setting controller 23, an execution controller 24, and an acquisition controller 25 (see FIG. 2). The controllers 22 to 25 are included in a control device of the charging and discharging device 20. Each of the controllers 22 to 25 may be realized by one or more processors and may be incorporated into a circuit.

In the setting controller 23, a charging and discharging condition database DB1 is registered. In the charging and discharging condition database DB1, a charging and discharging condition when charging and discharging is performed on the on-vehicle battery 12 is registered. As the charging and discharging condition, a current and a voltage during charging and discharging, a charging and discharging time, or the like is registered in association with a charging and discharging amount of the on-vehicle battery 12. In the charging and discharging condition database DB1, a charging and discharging condition for SOC acquisition used for calculating an SOC of the on-vehicle battery 12 is registered.

In this embodiment, the charging and discharging device 20 includes a charging and discharging device 20a owned by the user. The charging and discharging device 20a is placed in a parking lot of a home of the user such that charging and discharging is easily performed on the on-vehicle battery 12 of the electric vehicle 10 owned by the user himself or herself. The charging and discharging device 20a is connected to electric equipment of the home 40 of the user. The charging and discharging device 20a is configured to be able to supply electric power of the on-vehicle battery 12 also to the home 40.

<Electric Power System 30>

The electric power system 30 is configured by electric equipment that performs power generation, power transmission, power transformation, power distribution, or the like. An electric equipment of a customer is connected to the electric power system 30 via a transmission line or the like. The electric power system 30 supplies electric power to the electric equipment of the customer in accordance with a power demand.

<Home 40>

The home 40 is a residence of the user who owns the electric vehicle 10. In this embodiment, the home 40 includes a solar power generation device 42. The home 40 can be connected to the electric vehicle 10 and the electric power system 30 via the charging and discharging device 20a. Electric power generated by the solar power generation device 42 is used in the home 40. Excessive electric power can be supplied (that is, sold) to the electric power system 30 and can be used for charging the on-vehicle battery 12 of the electric vehicle 10 via the charging and discharging device 20.

<Charging and Discharging Control Device 50>

The charging and discharging control device 50 (which will be hereinafter referred to simply as the control device 50 as well) controls charging and discharging of the charging and discharging device 20 with respect to the on-vehicle battery 12 of the electric vehicle 10. There is no particular limitation on a configuration of the control device 50. Herein, the control device 50 is, for example, a microcomputer. The control device 50 includes, for example, an I/F, a CPU, a ROM, and a RAM. The control device 50 may be configured by a single computer and may be configured by a plurality of computers.

As illustrated in FIG. 2, the control device 50 includes a first communication controller 51 and a second communication controller 52. The control device 50 further includes a storage 60, a detection controller 61, a calculation controller 62, an SOC acquisition controller 63, a use information acquisition controller 64, a history acquisition controller 65, a determination controller 66, a plan acquisition controller 67, a setting controller 68, a demand acquisition controller 69, and a prediction controller 70. Each of the controllers 51 to 70 of the control device 50 may be realized by one or more processors and may be incorporated into a circuit.

The first communication controller 51 is configured or programmed to be communicable with the charging and discharging device 20. Herein, the first communication controller 51 is communicably connected to the communication controller 22 of the charging and discharging device 20. The second communication controller 52 is configured or programmed to be communicable with the user terminal 15 of the user using the electric vehicle 10. Herein, the second communication controller 52 is communicably connected to a terminal control device 18 of the user terminal 15. The storage 60 stores an SOC database DB2, a behavior information database DB3, and a power demand information database DB4 in advance.

Figure 3:
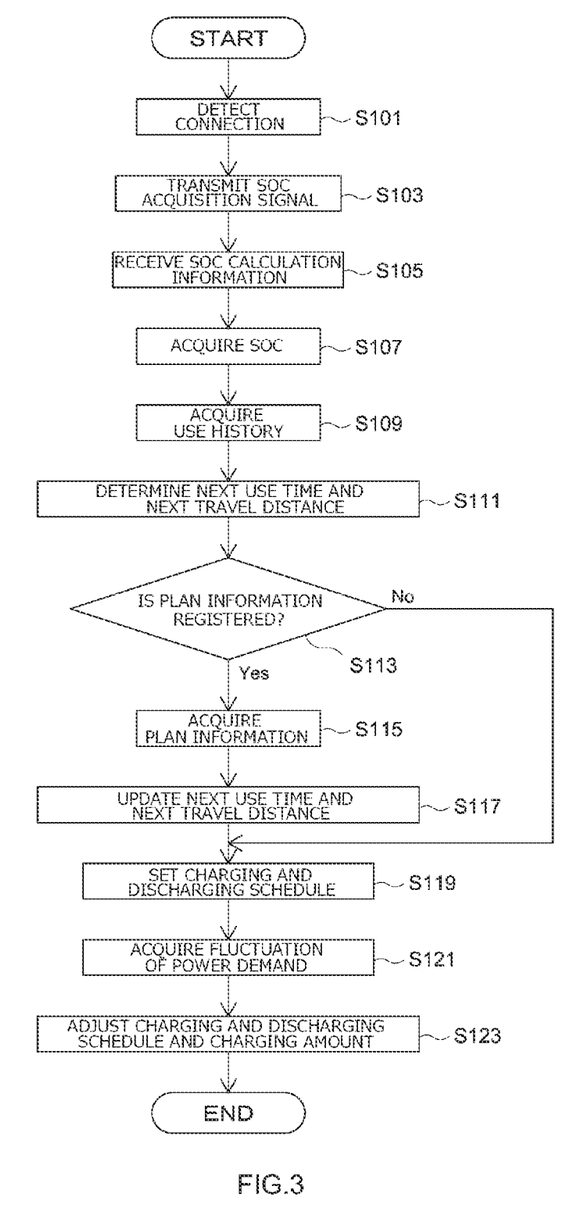
FIG. 3 is a flowchart illustrating steps of processes realized by a control device.

FIG. 3 is a flowchart illustrating steps of processes realized by the control device 50. The control device 50 is configured or programmed such that processes A to D as follows are realized:

Process A of detecting that the electric vehicle 10 has been connected to the charging and discharging device 20;

Process B of acquiring an SOC of the on-vehicle battery 12 of the electric vehicle 10 connected to the charging and discharging device 20;

Process C of acquiring a next use time and a next travel distance of the electric vehicle 10 connected to the charging and discharging device 20; and Process D of setting a charging and discharging schedule of the electric vehicle 10, based on at least the next use time and the next travel distance, such that the on-vehicle battery 12 is charged after having been maintained to be in a predetermined low SOC and a necessary SOC for the next use time and the next travel distance remains. The processes are started, for example, by connecting the electric vehicle 10 to the connector 21 of the charging and discharging device 20. Each of the processes will be specifically described below.

<Process a of Detecting that Electric Vehicle 10 has been Connected>

When the electric vehicle 10 is connected to the connector 21 of the charging and discharging device 20, the charging and discharging device 20 transmits a connection signal to the control device 50 via the communication controller 22. The control device 50 receives the connection signal by the first communication controller 51. The detection controller 61 is configured or programmed to detect that the electric vehicle 10 has been connected to the charging and discharging device 20 (S101 of FIG. 3).

<Process B of Acquiring SOC of On-Vehicle Battery 12>

When the detection controller 61 detects that the electric vehicle 10 has been connected to the charging and discharging device 20 in the process A, the control device 50 transmits an SOC acquisition signal to the charging and discharging device 20 via the first communication controller 51 (S103 of FIG. 3). The charging and discharging device 20 receives the SOC acquisition signal via the communication controller 22. When the charging and discharging device 20 receives the SOC acquisition signal, the setting controller 23 is configured or programmed to set a charging and discharging condition, based on a charging and discharging condition for acquiring an SOC registered in the charging and discharging condition database DB1. The execution controller 24 is configured or programmed to execute charging and discharging on the on-vehicle battery 12 of the electric vehicle 10 under the charging and discharging condition for acquiring the SOC set by the setting controller 23. During charging and discharging, the acquisition controller 25 is configured or programmed to acquire SOC calculation information. The SOC calculation information can be, for example, a charging and discharging current and a charging and discharging voltage. The SOC calculation information acquired by the acquisition controller 25 is transmitted to the control device 50 via the communication controller 22.

In this embodiment, the charging and discharging condition database DB1 is registered in the setting controller 23, but is not limited thereto. For example, the charging and discharging condition database DB1 may be stored in the storage 60 of the control device 50 and a charging and discharging condition may be transmitted along with the SOC acquisition signal when the SOC acquisition signal is transmitted.

The control device 50 receives the SOC calculation information via the first communication controller 51 (S105 of FIG. 3). The calculation controller 62 of the control device 50 is configured or programmed to calculate an SOC from the received SOC calculation information. In this embodiment, the SOC is calculated based on SOC calculation data registered in the SOC database DB2. The SOC calculation data is registered, for example, as data indicating a relationship between a charging and discharging current-charging and discharging voltage curve and the SOC. For example, the SOC is calculated by comparing the charging and discharging current and the charging and discharging voltage as the SOC calculation information with the SOC calculation data. The SOC acquisition controller 63 is configured or programmed to acquire the calculated SOC of the on-vehicle battery 12 (S107 of FIG. 3). The acquired SOC is used when a schedule is set in the subsequent process D. The acquired SOC is stored in the SOC database DB2. The stored SOC information can be used, for example, for next and subsequent calculations of the SOC and as deterioration progress degree information for the on-vehicle battery 12.

<Process C of Acquiring Next Use Time and Next Travel Distance of Electric Vehicle 10>

In the process C, the use information acquisition controller 64 is configured or programmed to acquire the next use time and the next travel distance of the electric vehicle 10. The use information acquisition controller 64 may be configured or programmed, for example, to acquire information related to the next use time and the next travel distance input to the user terminal 15 by the user via the second communication controller 52. The use information acquisition controller 64 may be configured or programmed, for example, to acquire the next use time and the next travel distance that match a behavior pattern of the user from a use history of the electric vehicle 10. The use history can be, for example, information in which a travel distance, position information, a use purpose, or the like of the electric vehicle 10 are associated with a time. The use history can include information, such as a use start time, a time of day during which the electric vehicle 10 is used, a travel distance, a use end time, a use frequency, a charging and discharging history, or the like. The use history is stored in the behavior information database DB3.

In this embodiment, the process C of acquiring a next use time and a next travel distance includes a process of acquiring and storing the use history of the electric vehicle 10 (S109 of FIG. 3) and a process of determining at least one of a use start time and a planned travel distance, based on the stored use history (S111 of FIG. 3).

<Process of Acquiring and Storing Use History>

The history acquisition controller 65 is configured or programmed to acquire the use history (S109 of FIG. 3). The use history is acquired, for example, by a communication control device (not illustrated) of the electric vehicle 10. The communication control device transmits the acquired use history to the user terminal 15. The user terminal 15 transmits the use history to the control device 50 via the terminal control device 18. The history acquisition controller 65 acquires the received use history. The storage 60 stores the use history acquired by the history acquisition controller 65 in the behavior information database DB3, There is no particular limitation on frequency and a method of transmitting the use history acquired by the electric vehicle 10 to the control device 50. For example, the use history may be automatically transmitted to the control device 50 from the user terminal 15 at predetermined intervals, that is, once a day or the like. The use history may be transmitted to the control device 50 from the user terminal 15 at a timing designated by the user. The use history may be transmitted to the control device 50 via the charging and discharging device 20. For example, in a case where the electric vehicle 10 includes the user terminal 15, when the electric vehicle 10 is connected to the connector 21, the use history may be acquired by the charging and discharging device 20 and be transmitted to the control device 50 via the communication controller 22.

<Process of Determining Next Use Time and Next Travel Distance>

The determination controller 66 is configured or programmed to determine at least one of the next use time and the next travel distance (S111 of FIG. 3). In this embodiment, the determination controller 66 executes a process of determining both the next use time and the next travel time, based on the use history.

The determination controller 66 can determine the next use time and the next travel distance by leaning a behavior pattern of the user and a use pattern of the electric vehicle 10, based on the use history.

For example, for a working date of the user, the next use time and the next travel distance can be determined from trends of the use start time and the travel distance included in the use history of working dates in past. For a holiday, the next use time and the next travel distance that are different from those for the working date can be determined. If the user does not drive the electric vehicle 10 much on holidays, the next use time can be set to be a late time and the next travel distance can be set short for a holiday. If the user often drives the electric vehicle 10 for a long distance on holidays, the next use time can be set to be an early time and the next travel distance can be set long for a holiday. The next travel distance may be different from a travel distance for one day. The next travel distance can be a travel distance until the electric vehicle 10 is connected to the charging and discharging device 20 after a start of use of the electric vehicle 10. For example, in a case where the charging and discharging device 20 is installed in a workplace of the user and the electric vehicle 10 can be charged until the user leaves the workplace, the next travel distance for a working date can be a one-way distance to the work place.

The process C of acquiring the next use time and the next travel distance may include a process of acquiring plan information of the electric vehicle 10 (S115 of FIG. 3) and a process of determining at least one of the next use time and the next travel distance, based on the plan information (S117 of FIG. 3). In this embodiment, the process C may further include a process of determining whether the plan information is registered in the user terminal 15 (S113 of FIG. 3). If it is determined that the plan information is registered in the user terminal 15, the process of acquiring the plan information (S115) is executed subsequently. Then, the process of determining at least one of the next use time and the next travel distance (S117) is executed. Thus, the next use time and the next travel distance are newly determined and updated.

<Process of Determining Whether Plan Information is Registered>

The plan acquisition controller 67 is configured or programmed to determine whether the plan information for a plan of using the electric vehicle 10 has been registered in the user terminal 15 within a certain period (for example, within 24 hours) (S113 of FIG. 3). If the plan information has been registered in the user terminal 15, a result of determination is YES and the process proceeds to the process of acquiring the plan information of the electric vehicle 10 (S115 of FIG. 3). If the plan information has not been registered in the user terminal 15, the result of determination is NO and the process proceeds to the process of setting the charging and discharging schedule of the electric vehicle 10 (S119 of FIG. 3).

<Process of Acquiring Plan Information of Electric Vehicle 10>

The plan acquisition controller 67 acquires the plan information of the electric vehicle 10 (S115 of FIG. 3). The user terminal 15 transmits the registered plan information to the control device 50 via the terminal control device 18. The plan acquisition controller 67 acquires the received plan information. The plan information may be, for example, a use plan registered in a software used for managing the electric vehicle 10. The plan information may be, for example, a schedule registered in a software of the user terminal 15 used for managing a schedule. The plan information may be, for example, automatically transmitted from the user terminal 15 and may be transmitted by input performed by the user via an input device 17 of the user terminal 15.

<Process of Determining Next Use Time and Next Travel Distance>

The determination controller 66 determines at least one of the next use time and the next travel distance (S117 of FIG. 3). In this embodiment, the determination controller 66 executes a process of determining both the next use time and the next travel distance, based on the plan information acquired by the plan acquisition controller 67. Herein, the next use time and the next travel distance determined in S111 of FIG. 3 are updated.

For example, in a case where a destination is registered as the plan information, the next travel distance may be determined based on a distance to the destination. If there is the charging and discharging device 20 near the destination, the next travel distance can be set short. The next use time may be determined based on the distance to the destination and an expected required time to reach the destination.

<Process D of Setting Charging and Discharging Schedule of Electric Vehicle 10>

Next, the control device 50 executes the process D of setting the charging and discharging schedule of the electric vehicle 10. In the process D, the setting controller 68 is configured or programmed to set the charging and discharging schedule of the electric vehicle 10 (S119 of FIG. 3). The process D is executed based on the SOC acquired in the process B and the next use time and the next travel distance determined in the process C. The charging and the discharging schedule is determined to be a schedule in which the on-vehicle battery 12 is charged after having been maintained in a low SOC and a necessary SOC for the next use time and the next travel distance remains.

In this embodiment, the SOC after charging has been adjusted such that predetermined electric power can be supplied to predetermined electric equipment (the home 40 herein (see FIG. 1)) from the on-vehicle battery 12. In the process D of setting a schedule, the charging and discharging schedule is set such that electric power is supplied to the electric equipment (the home 40 herein) at a predetermined timing. That is, a charging amount and a timing of charging are adjusted such that a necessary SOC for traveling for the next travel distance remains in the electric vehicle 10 after electric power has been supplied to the home 40.

As used herein, the term "a low SOC" refers to an SOC that satisfies at least one of a lower SOC than a residual SOC amount of the on-vehicle battery 12 after the electric vehicle 10 has been used and an SOC that will be described later and in which deterioration of the on-vehicle battery 12 is suppressed. That is, the term "to maintain in a low SOC" may be to maintain an SOC without charging the on-vehicle battery 12 after the electric vehicle 10 has been used and may be to maintain an SOC in a state where the on-vehicle battery 12 is discharged after the electric vehicle 10 has been used to reduce the SOC. Moreover, the term "to maintain in a low SOC" may be to maintain, after charging has been performed in a range of an SOC that will be described later or lower in which suppresses deterioration of the on-vehicle battery 12 is suppressed, the SOC in the range.

From viewpoint of suppressing deterioration of a battery, the SOC of the on-vehicle battery 12 of the electric vehicle 10 is preferably made as low as possible. Influence of the SOC on deterioration of the battery differs depending on a type or the like of the on-vehicle battery 12, and therefore, there is no particular limitation thereon. The low SOC is preferably set to be an SOC or less in which deterioration of the on-vehicle battery 12 is suppressed. According to findings of the present inventors, in order to suppress deterioration of the on-vehicle battery 12, the SOC of the on-vehicle battery 12 while the electric vehicle 10 is not used is, for example, preferably 70% or less, more preferably 60% or less, and further preferably 50% or less.

The SOC of the on-vehicle battery 12 may be maintained at a level at which, even while the electric vehicle 10 is not used, unplanned use of the electric vehicle 10 or the like is possible. The low SOC may be set to be equal to or more than an SOC that enables travelling for a predetermined distance. The SOC of the on-vehicle battery 12 while the electric vehicle 10 is not used differs depending on a lifestyle, a residential area, or the like, but may be set to an SOC that enables travelling for a distance predetermined by the user or the like, and a necessary amount for travelling may be set from a behavior pattern of the user, based on the use history. The SOC of the on-vehicle battery 12 while the electric vehicle 10 is not used may be, for example, 10% or more, 15% or more, and 20% or more.

<Process E of Acquiring Fluctuation of Power Demand in Electric Power System 30>

In this embodiment, in addition to the above-described processes A to D, a process E of acquiring a fluctuation of a power demand in the electric power system 30 is further executed. In the process E, the demand acquisition controller 69 is configured or programmed to acquire a fluctuation of a power demand of an electric power system (S121 of FIG. 3). The power demand fluctuates, for example, due to a time of day, weather, a day of week, a season, or the like. In this embodiment, a past power demand is stored in the power demand information database DB4. The prediction controller 70 is configured or programmed to predict fluctuations of the power demand at a time of charging and discharging and at a time of use of the electric vehicle 10, based on a fluctuation of the past power demand stored in the power demand information database DB4. The demand acquisition controller 69 acquires the fluctuations of the power demand predicted by the prediction controller 70.

The setting controller 68 is configured or programmed to set the charging and discharging schedule and the charging and discharging amount in accordance with the fluctuation of the power demand acquired by the demand acquisition controller 69 (S123 of FIG. 3). A timing of discharging may be set such that, when the power demand of the electric power system 30 is high, electric power is discharged to the electric power system 30 from the on-vehicle battery 12. Moreover, a timing of charging may be set such that, when the power demand of the electric power system 30 is low, electric power is charged to the on-vehicle battery 12 from the electric power system 30. The SOC after charging may be adjusted such that electric power of a large amount can be supplied to the electric power system 30 when the power demand is high.

Figure 4:
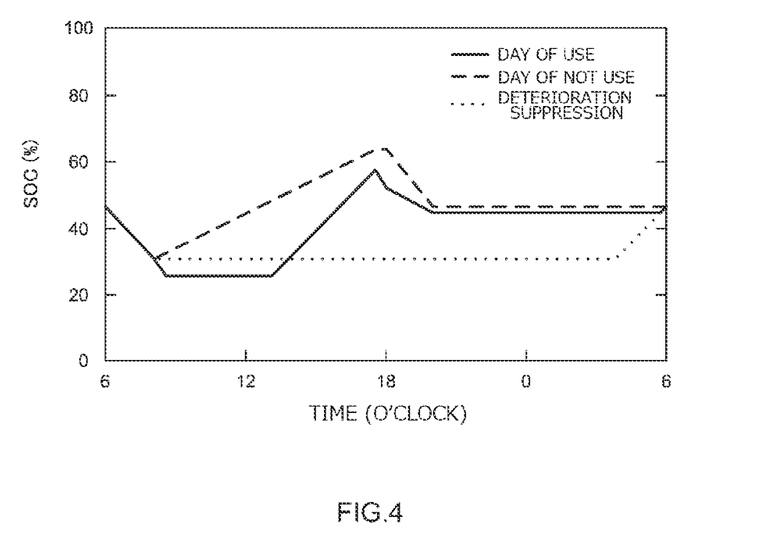
FIG. 4 is a graph illustrating an example of a fluctuation of an electric power amount of an on-vehicle battery.

The charging and discharging schedule that is set based on the use plan of the electric vehicle 10 and the fluctuation of the power demand will be described by mentioning a day on which the electric vehicle 10 is used and a day on which the electric vehicle 10 is not used. FIG. 4 is a graph illustrating an example of a fluctuation of an electric power amount of the on-vehicle battery 12. In FIG. 4, the fluctuation of the electric power amount of the on-vehicle battery 12 for each of the day on which the electric vehicle 10 is used and the day on which the electric vehicle 10 is not used is indicated.

Herein, the on-vehicle battery 12 of the electric vehicle 10 has a full charge (SOC 100%) capacity of 62 kWh. Power of the charging and discharging device 20 is 4.5 KW (7%/h in terms of SOC). The home 40 includes the solar power generation device 42. A power generation amount of the solar power generation device 42 is 20 kWh (about 32% in terms of SOC) per day and the electric power amount can be used by the electric vehicle 10 and the home 40. In the home 40, an electric power amount of 9.3 kWh (about 15% in terms of SOC) is consumed from 6 a.m. to 8 a.m., an electric power amount of 4.7 kWh (about 8% in terms of SOC) is consumed from 6 p.m. to 8 p.m., and a total electric power amount of 14 kWh (about 23% in terms of SOC) is consumed.

The electric power generated by the solar power generation device 42 is preferentially used in the home 40. Electric power obtained by subtracting the electric power used in the home 40 from the electric power generated by the solar power generation device 42 is used for travelling of the electric vehicle 10. In a case where the electric power generated by the solar power generation device 42 becomes insufficient for electric power used in the home 40 and electric power used for travelling of the electric vehicle 10, charging is performed in a time of day during which the power demand is low. In a case where the electric power generated by the solar power generation device 42 becomes excessive to the electric power used in the home 40 and the electric power used for travelling of the electric vehicle 10, discharging to the electric power system 30 is performed in a time of day during which the power demand is high. In this embodiment, the charging and discharging amount is adjusted such that a total of a charging amount and a total of a discharging amount are equal to each other for both the day on which the electric vehicle 10 is used and the day on which the electric vehicle 10 is not used.

<Charging and Discharging Schedule for Day on which Electric Vehicle 10 is Used>

In FIG. 4, an example of the charging and discharging schedule of the on-vehicle battery 12 for a day on which the electric vehicle 10 is used is indicated by a solid line. For the day on which the electric vehicle 10 is used, the electric power amount consumed for travelling of the electric vehicle 10 calculated based on the next travel distance (that is, a reciprocating distance to a destination) is 7 kWh (about 11% in terms of SOC). The charging and discharging device 20 is installed in the destination. The next use time (that is, the use start time) of the electric vehicle 10 is 8 a.m. A lower limit of the electric power amount is set to a total of an electric power amount of 12.4 kWh (about 20% in terms of SOC) for unplanned use and an electric power amount of 3.5 kWh consumed for travelling to the destination. That is, a lower limit of the charging amount is set to 15.9 kWh. If the charging amount is lower than the lower limit of the charging amount when the electric vehicle 10 is connected to the charging and discharging device 20, charging is performed until the charging amount reaches the lower limit of the charging amount, and then, a charging amount at the lower limit is maintained.

An electric power amount generated by the solar power generation device 42 is 20 kWh, an electric power amount consumed in the home 40 is 14 kWh, and an electric power amount used for travelling of the electric vehicle 10 is 7 kWh, and therefore, a shortfall of 1 kWh of electric power is assumed. The setting controller 68 sets the charging and discharging schedule such that an electric power corresponding to the shortfall of 1 kWh is charged in a time of day during which the power demand is low, that is, during night and early morning hours. Thus, cost of purchasing electric power can be cut. As illustrated in FIG. 4, herein, in morning, charging is performed on the on-vehicle battery 12 from 5:45 a.m. to 6 a.m. immediately before electric power is supplied to the home 40. The charging and discharging schedule is set such that, by performing charging immediately before use, a time during which a low SOC is maintained is made long.

Electric power is supplied to the home 40 from the on-vehicle battery 12 from 6 a.m. to 8 a.m. The electric power of the on-vehicle battery 12 is consumed by travelling of the electric vehicle 10 from 8 a.m. to 8:30 a.m. Even when the electric vehicle 10 arrives at a destination and is connected to the charging and discharging device 20, charging is not immediately performed and a low SOC is maintained. Then, charging is started at 1 p.m. such that charging is completed at 5:30 p.m. that is a next use time. As for the charging herein, charging can be remotely performed from the solar power generation device 42 by simultaneously performing charging with supply of the electric power generated by the solar power generation device 42 to the electric power system 30.

From 5:30 p.m. to 6 p.m., the electric power of the on-vehicle battery 12 is consumed by travelling of the electric vehicle 10. The electric vehicle 10 is connected to the charging and discharging device 20a at 6 p.m. Electric power is supplied to the home 40 from the on-vehicle battery 12 from 6 p.m. to 8 p.m. Charging is not performed after 8 p.m. and a low SOC is maintained. At that time, very small electric power out of the electric power stored in the on-vehicle battery 12 can be consumed in the home 40. From next 5:45 a.m. to 6:00 a.m., that is, immediately before electric power is supplied to the home 40, charging to the on-vehicle battery 12 is performed.

<Charging and Discharging Schedule for Day on which Electric Vehicle 10 is not Used>

In FIG. 4, an example of the charging and discharging schedule of the on-vehicle battery 12 for a day on which the electric vehicle 10 is not used is indicated by a broken line. For the day on which the electric vehicle 10 is not used, the electric power amount generated by the solar power generation device 42 is 20 kWh and the electric power amount consumed in the home 40 is 14 KWh, and therefore, it is assumed that an electric amount of 6 kWh is excessive. The setting controller 68 sets the charging and discharging schedule such that excessive electric power is supplied to the electric power system 30 in a time of day during which the power demand is high.

Similar to the day on which the electric vehicle 10 is used, electric power is supplied to the home 40 from the on-vehicle battery 12 from 6 a.m. to 8 a.m. The electric power generated by the solar power generation device 42 is charged to the on-vehicle battery 12 from 8 a.m. to 5:30 p.m. Discharging from the on-vehicle battery 12 is performed from 6 p.m. to 8 p.m. Since the power generation amount is excessive to consumption of the electric power in the home 40, in addition to supply of electric power to the home 40, supply of electric power to the electric power system 30, that is, selling of electric power, is performed. In the time of day in evening, in general, the power demand is high. Profits gained by selling electric power can be increased by supplying electric power to the electric power system 30 when the power demand is high. Charging is not performed after 8 p.m. and a low SOC is maintained. At that time, very small electric power out of the electric power stored in the on-vehicle battery 12 can be consumed in the home 40.

Herein, the charging and discharging schedule has been described separately for the day on which the electric vehicle 10 is used and the day on which the electric vehicle 10 is not used, but it is not necessary to perform charging and discharging as scheduled in the charging and discharging schedule that has been set. For example, the charging and discharging schedule that has been set may be transmitted to the user terminal 15 via the second communication controller 52. The user may check the charging and discharging schedule that has been transmitted and adjust the charging and discharging schedule by the input device 17. For example, on the day on which the electric vehicle 10 is not used, if the user wants to give priority to suppression of deterioration of the on-vehicle battery 12 over selling electric power, the charging and discharging schedule can be set to a charging and discharging schedule indicated by a dotted line in FIG. 4. That is, the charging and discharging schedule may be adjusted to a charging and discharging schedule in which, after 8 p.m. when consuming electric power in the home 40 is finished, neither charging nor discharging is performed and charging is performed after next 4 a.m. so that charging is completed before next 6 a.m. when electric power is supplied to the home 40. In this case, the electric power generated by the solar power generation device 42 can be consumed in the home 40 and by selling electric power. The on-vehicle battery 12 does not participate in supply of electric power to the electric power system 30 and the home 40, but a time of day during which the SOC of the on-vehicle battery 12 is low can be made longer. Thus, deterioration of the on-vehicle battery 12 can be further suppressed. Moreover, in a time of day from midnight to dawn (for example, from midnight to 6 a.m.), the power demand can be relatively low. Therefore, an electric power purchase price can be suppressed by performing charging in a period from 4 a.m. to 6 a.m. As described above, the charging and discharging schedule that has been set may be variously changed in accordance with needs of the user.

In the above-described embodiment, the charging and discharging schedule of the on-vehicle battery 12 of the electric vehicle 10 is set such that the on-vehicle battery 12 is charged after having being maintained in a low SOC and a necessary SOC for a next use time and a next travelling distance remains at a next use time. That is, the charging and discharging schedule is set such that a time during which the on-vehicle battery 12 is maintained in a low SOC is made long. Thus, deterioration of the on-vehicle battery 12 can be reduced.

In the above-described embodiment, the process C of acquiring the next use time and the next travel distance includes the process of acquiring and storing the use history of the electric vehicle 10 and the process of determining at least one of the next use time and the next travel distance, based on the stored use history, By performing the above-described processes, the charging and discharging schedule can be easily determined and a burden on the user can be reduced.

Moreover, the process C of acquiring the next use time and the next travel distance includes the process of acquiring the plan information of the electric vehicle 10 and the process of determining at least one of the next use time and the next travel distance, based on the plan information. By performing the above-described processes, it is possible to modify the charging and discharging schedule as appropriate even in a case where the user has a different plan from a usual plan or in a case where an urgent plan comes up.

In the above-described embodiment, the SOC after charging is adjusted such that predetermined electric power can be supplied to predetermined electric equipment from the on-vehicle battery 12. In the process D of setting a schedule, the charging and discharging schedule is set such that electric power is supplied to the electric equipment at a predetermined timing. Thus, a power demand of the electric equipment can be met while deterioration of the on-vehicle battery 12 is suppressed.

A chairing and discharging control device disclosed herein has been described above in various manners. The embodiment or the like described herein shall not limit the present disclosure, unless specifically stated otherwise. Various changes can be made to the charging and discharging control device disclosed herein and each of components and processes described herein can be omitted as appropriate or can be combined with another one or other ones of the components and the processes as appropriate, unless a particular problem occurs.

What is claimed is:

1. A charging and discharging control device that controls a charging and discharging device that charges and discharges an on-vehicle battery mounted on an electric vehicle, the charging and discharging control device comprising:
    a detection controller configured or programmed to detect that the electric vehicle has been connected to the charging and discharging device;
    an SOC acquisition controller configured or programmed to acquire an SOC of the on-vehicle battery of the electric vehicle connected to the charging and discharging device;
    a use information acquisition controller configured or programmed to acquire a next use time and a next travel distance of the electric vehicle connected to the charging and discharging device; and
    a setting controller configured or programmed to set a charging and discharging schedule of the on-vehicle battery of the electric vehicle such that the on-vehicle battery is charged after having been maintained in a low SOC and a necessary SOC for the next use time and the next travel distance remains in the on-vehicle battery,
    the setting controller being configured or programmed to set the charging and discharging schedule of the on-vehicle battery such that a shortfall of electric power is charged to the on-vehicle battery immediately before the next use time.

2. The charging and discharging control device according to claim 1, wherein
    the low SOC is set to be equal to or less than an SOC in which deterioration of the on-vehicle battery is suppressed.

3. The charging and discharging control device according to claim 1, wherein
    the low SOC is set to be equal to or more than an SOC in which the electric vehicle can travel for a predetermined distance.

4. The charging and discharging control device according to claim 1, further comprising:
a history acquisition controller configured or programmed to acquire a use history of the electric vehicle;
a storage device that stores the use history; and
a determination controller configured or programmed to determine at least one of the next use time and the next travel distance based on the use history that has been stored.

5. The charging and discharging control device according to claim 1, further comprising:
a plan acquisition controller configured or programmed to acquire plan information of the electric vehicle; and
a determination controller configured or programmed to determine at least one of the next use time and the next travel distance based on the plan information.

6. The charging and discharging control device according to claim 1, further comprising:
a demand acquisition controller configured or programmed to acquire a fluctuation of a power demand in an electric power system, wherein
the setting controller is configured or programmed to set the charging and discharging schedule such that electric power is discharged to the electric power system from the on-vehicle battery when the power demand of the electric power system is high.

7. The charging and discharging control device according to claim 1, further comprising:
a demand acquisition controller configured or programmed to acquire a fluctuation of a power demand in an electric power system, wherein
the setting controller is configured or programmed to set the charging and discharging schedule such that electric power is charged to the on-vehicle battery from the electric power system when the power demand of the electric power system is low.

8. The charging and discharging control device according to claim 1, wherein
the SOC after charging is adjusted such that predetermined electric power can be supplied to predetermined electric equipment from the on-vehicle battery, and
the setting controller is configured or programmed to set the charging and discharging schedule such that the electric power is supplied to the electric equipment at a predetermined timing.

9. The charging and discharging control device according to claim 1, wherein
the setting controller is configured or programmed to set the charging and discharging schedule such that
charging is not immediately performed when the electric vehicle is connected to the charging and discharging device and the low SOC is maintained, and
charging is completed at the next use time.

* * * * *